3,761,436
CATALYTIC CONVERSION OF AMINOALKYL
LACTAMS TO DIAZABICYCLOALKENES
Sei Hashimoto, Keizo Nakatani, Shoji Suzuki, Hiroshi Daigo, and Kiyohiko Sugiura, Kyoto, Japan, assignors to San-Abbott Limited, Kyoto, Japan
No Drawing. Filed May 7, 1971, Ser. No. 143,684
Int. Cl. C07d 51/46
U.S. Cl. 260—251 A  6 Claims

ABSTRACT OF THE DISCLOSURE

Diazabicycloalkenes are prepared from N-(aminoalkyl)-lactams by dehydration in the presence of tin oxides or antimony oxides.

DETAILED DESCRIPTION OF THE INVENTION

The methods for the preparation of diaza-bicyclo-alkenes from N-(aminoalkyl)-lactams known from the literature all require the use of acid catalysts and the use of such acids has always been considered essential. However, when the acids mentioned in the literature are employed (e.g., phosphoric, hydrochloric, sulfuric, p-toluenesulfonic acid and others), they form acid addition salts with the bicyclic compounds formed in the reaction, thereby reducing the reaction yield of the basic compound to a considerable extent. Unfortunately, the usual methods to remove such acids subsequently are unsatisfactory, e.g., separation by distillation concentrates the acid in the still, causing excessive corrosion to the still; filtration is not possible because of the high solubility, etc. However, for many of the end uses the diaza-bicyclo-alkenes are intended, a high degree of purity is not required, as long as remaining impurities are not acidic.

It is therefore an object of the present invention to prepare diaza-bicyclo-alkenes from N-(aminoalkyl)-lactams without the use of acid catalyst; it is another object of the present invention to carry out this preparation method in a manner that produces high yields of the desired end product.

These and other objects are accomplished by heating a N-(aminoalkyl)-lactam of the formula

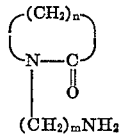

wherein $n$ is 2–11 and $m$ is 2–6 and wherein each of the methylene groups may carry a loweralkyl substituent in a water-immiscible solvent in the presence of at least one kind of an oxide of tin or antimony for several hours while simultaneously removing water. The process produces the desired diaza-bicycloalkene of the formula

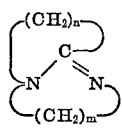

wherein $m$ and $n$ have the above meaning and each methylene group will carry the loweralkyl substituent present in the starting material in yields usually exceeding 75% of theory, even when reacted only in laboratory batch sizes. Among the suitable tin or antimony oxides used, particularly good results are obtained with stannous oxide, stannic oxide, diethyltin oxide, dibutyltin oxide, diantimony trioxide, diantimony tetroxide, diantimony pentoxide and the like. The used amount of this type of catalyst is usually best selected between 0.10 and 15% by weight of the N-(aminoalkyl)-lactam used, preferably between 0.1 and 10% by weight. The heating temperature for this reaction is at 150° C. or above with the upper temperature limit being dictated by the decomposition or boiling temperature of the starting material, the solvent used, or the end product. For practical reasons, the reaction temperatures are limited to the range of 150–280° C.

Among the solvents that may successfully be employed in the present method, those having a high boiling point are preferred; these include toluene, xylene, nonane, decene, cymene, cumene, naphthalene, tetrahydronaphthalene, hexanol and the like. If the chosen solvent does not have a boiling point sufficiently high to permit satisfactory heating, the present reaction may be carried out under pressure.

In a specific embodiment of the present invention, the N-(aminoalkyl)-lactam is placed in a recation vessel equipped with a water-separator. Solvent and catalyst are added and the mixture is heated to a temperature above 150° C. while water is removed continuously through the separator or by azeotropic distillation. After several hours, usually at least four (4), the solvent is removed by distillation, if desired, under reduced pressure and subsequently, the formed diazabicyclo-alkene is distilled under reduced pressure. The end product so obtained does not form an adduct with the catalyst and the absence of an acid eliminates the danger of excessive corrosion to the reaction/distillation vessel.

In another embodiment, the catalyst is removed prior to distillation of the end product, particularly when that product is not required to be obtained in high purity. In that case, the catalyst is filtered off and the solvent is distilled off the diaza-bicycloalkene which is thereby obtained without further work-up in a degree of purity sufficient for many intended end uses.

In order to illustrate the method of the present invention in further details, reference is made to the following examples which, however, are not intended to limit the invention in any respect.

EXAMPLE 1

In a flask equipped with a water separation apparatus, 200 g. of N-(3-aminopropyl)-caprolactam (purity: 89.1%; reaction product obtained by hydrogenating N-(2-cyanoethyl)-caprolactam in the presence of methanol and Raney nickel, filter and topping), 100 g. of xylene and 2 g. of diantimony trioxide were heated at 150–170° C. for 6 hours while removing water. The xylene was then removed by distillation and the reaction mixture was distilled to produce 128 g. (80.5% yield) of 1,8-diazabicyclo-(5,4,0) undecene-7 boiling at 138–140 C./25 mm. Hg.

EXAMPLE 2

In a similar fashion as in Example 1, 200 g. of N-(3-aminopropyl)-caprolactam, 100 g. of xylene and 2 g. of dibutyltin oxide were heated at 150–160° C. for 6 hours to produce 120 g. (75.3% yield) of 1,8-diazabicyclo (5,4,0)-undecene-7 boiling at 143° C./36 mm. Hg.

EXAMPLE 3

In a similar fashion as in Example 1, 69 g. of N-(3-aminopropyl)-γ-butyrolactam, 40 g. of p-cymene and 0.7 g. of diantimony trioxide were heated at 200–205° C. for 10 hours to produce 34 g. (72% yield) of 1,5-diazabicyclo(4,3,0)nonene-5 boiling at 118–121° C./32 mm. Hg.

In the same fashion as shown above, the following diaza-bicyclo-alkenes were prepared:

1,5-diaza-bicyclo(4,4,0)decene-5
1,8-diaza-bicyclo(7,4,0)tridecene-8
1,8-diaza-bicyclo(5,3,0)-decene-7

9-methyl-1,8-diaza-bicyclo(5,3,0)decene-7
1,8-diaza-bicyclo(5,4,0)undecene-7
1,6-diaza-bicyclo(5,5,0)dodecene-6
1,7-diaza-bicyclo(6,5,0)tridecene-7
1,8-diaza-bicyclo(7,5,0)tetradecene-8
1,10-diaza-bicyclo(7,3,0)dodecene-9
1,10-diaza-bicyclo(7,4,0)tridecene-9
1,14-diaza-bicyclo(11,3,0)hexadecene-13
1,14-diaza-bicyclo(11,4,0)heptadecene-13

Useful starting materials to prepare the above and other diaza-bicyclo-alkenes are, for example:

N-(3-aminopropyl)-β-propiolactam
N-(2-aminoethyl)-γ-butyrolactam
N-(3-aminopropyl)-γ-butyrolactam
N-(2-methyl-3-aminopropyl)-γ-butyrolactam
N-(3-aminopropyl)-β-(methyl)-γ-butyrolactam
N-(6-aminohexyl)-γ-butyrolactam
N-(2-aminoethyl)-δ-valerolactam
N-(3-aminopropyl)-δ-valerolactam
N-(2-aminoethyl)-ε-caprolactam
N-(3-aminopropyl)-ε-caprolactam
N-(6-aminohexyl)-ε-caprolactam
N-(3-aminopropyl)-ζ-caprylolactam
N-(3-aminopropyl)-ζ-laurylolactam and homologs thereof carrying loweralkyl substituents on the methylene groups. The diaza-bicyclo-alkenes made by the present process are useful as anti-corrosives and as catalysts in the production of urethane foams and the hardening of epoxy resins.

We claim:

1. The method for preparing a diaza-bicyclo-alkene of the formula

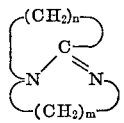

wherein the $n$ is an integer from 2 to 11 and $m$ is an integer from 2–6 inclusive and wherein any of the methylene groups may carry a loweralkyl substituent, comprising heating to a temperature of at least 150° C. a N-(aminoalkyl)-lactam of the formula

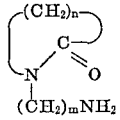

wherein $n$ and $m$ have the above meaning and any methylene group may carry a loweralkyl substituent, in the presence of between 0.1 and 15% by weight of said lactam of at least one oxide of tin, diethyltin, dibutyltin, or antimony.

2. The method of claim 1 wherein said oxide is the oxide of a dialkyltin.

3. The method of claim 1 wherein said dialkyltin oxide is dibutyltin oxide.

4. The method of claim 1 wherein said oxide is an oxide of antimony.

5. The method of claim 4 wherein said oxide of an antimony compound is diantimony trioxide.

6. The process of claim 1 wherein said heating is carried out in the presence of a water-immiscible solvent for a period of at least 4 hours.

References Cited
FOREIGN PATENTS
1,121,924   9/1966   Great Britain.

ALEX MAZEL, Primary Examiner

R. V. RUSH, Assistant Examiner

U.S. Cl. X.R.

252—390, 431 R, 461; 260—239 A, 239 BC, 293.55, 309.6, 326.85